April 25, 1933.   R. T. CLOUD   1,905,153
METHOD OF PRODUCING HIGH FREQUENCY LIGHT VARIATIONS
Filed Jan. 27, 1930   3 Sheets-Sheet 1

Inventor
Raymond T. Cloud
By Luther Johns
Atty.

April 25, 1933.  R. T. CLOUD  1,905,153
METHOD OF PRODUCING HIGH FREQUENCY LIGHT VARIATIONS
Filed Jan. 27, 1930  3 Sheets-Sheet 2

Inventor
Raymond T. Cloud
By Luther Johns
Atty.

April 25, 1933.　　　　R. T. CLOUD　　　　1,905,153
METHOD OF PRODUCING HIGH FREQUENCY LIGHT VARIATIONS
Filed Jan. 27, 1930　　　3 Sheets-Sheet 3
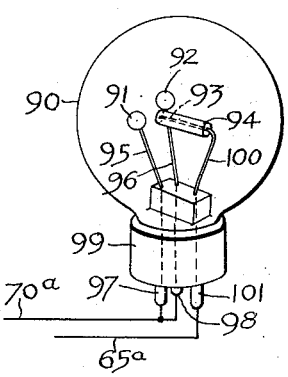
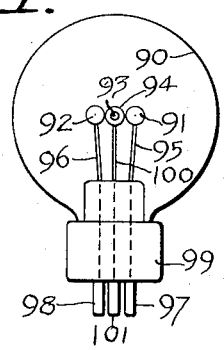
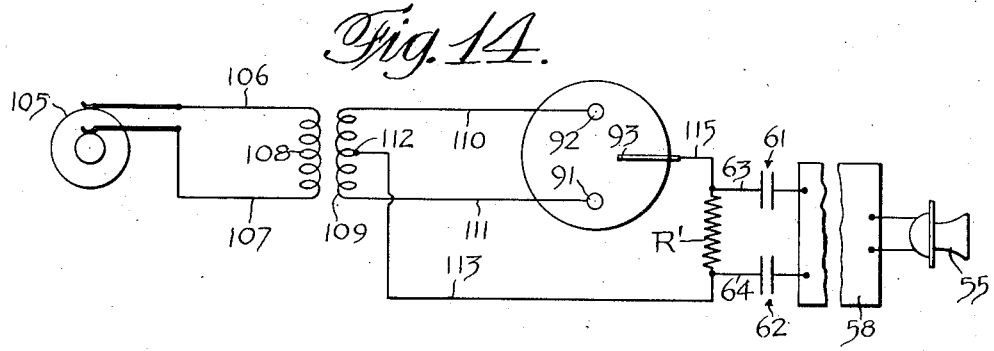
Inventor
Raymond T. Cloud
By Luther Johns, Atty.

Patented Apr. 25, 1933

1,905,153

UNITED STATES PATENT OFFICE

RAYMOND T. CLOUD, OF CHICAGO, ILLINOIS, ASSIGNOR, BY MESNE ASSIGNMENTS, TO GENERAL THEATRES EQUIPMENT, INC., OF NEW YORK, N. Y., A CORPORATION OF DELAWARE

METHOD OF PRODUCING HIGH FREQUENCY LIGHT VARIATIONS

Application filed January 27, 1930. Serial No. 423,600.

The present invention relates to means for producing light and to methods for using the same. It will have various applications in use, important among which are in the recording and reproducing of vibrations such as those of light and sound. The light source may be constant or it may be modulated as the use may require.

The prime object of the invention is to provide highly advantageous recording and reproducing results, and, so far as I am now advised, results greatly superior to any heretofore attained. This is accomplished through the provision of what I now believe to be a novel kind of light source, which may be of exceedingly small area, or of greater area, for particular uses, and one, also, of exceptionally high intrinsic brightness, which brightness may be modulated through a notably high range of frequencies, as for example those of air vibrations throughout the effectively audible range.

It is an object to provide various advantageous constructions and arrangements of parts for such a lamp, and also to provide a suitable circuit or type or character of circuit for the same.

Other objects and advantages will appear hereinafter.
Referring to the drawings, Figure 1 is a side elevation of the preferred form in general of my improved tube or lamp with the electrodes in perspective;

Fig. 10 shows in perspective a modified form of tube having three electrodes;

Fig. 11 shows the same tube in front view;

Fig. 12 is an enlarged detail of the cathode member of Figs. 10 and 11;

Fig. 13 is an end view of the same cathode; and

Fig. 14 is a diagrammatic and fragmentary view showing an application of the three-electrode tube.

Figure 1:
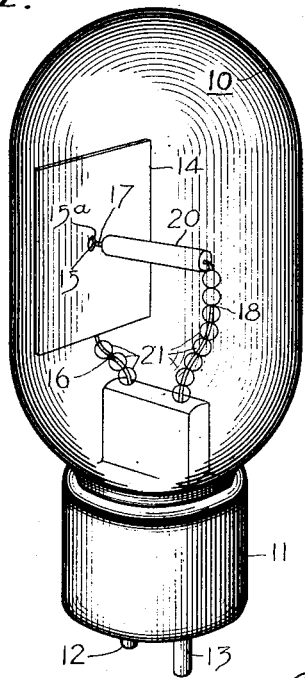

In order that my present invention may be more easily and more clearly understood I may discuss briefly features and characteristics of some of the devices heretofore used for such purposes as the recording and reproducing of sound through light variations.

Any gas in its normal state has a considerable number of free ions moving therein at various velocities. Some of these are positive and some negative, and these to some extent are constantly being recombined. Due, however, to the high velocities of some of these free ions the atoms and molecules collided with are broken up, with the liberation of other free ions, which in turn move about freely until recombined.

When a voltage of sufficient value is applied between electrodes in a tube or bulb containing a gas adapted to be ionized, ions are liberated to a marked extent and at high velocities. This is known as disruptive discharge or disruptive conduction, and when this occurs to such an extent that more free ions are produced than are then and there recombined the gas becomes more highly conductive to the current, and becomes luminous, taking on a variety of visible forms such as a spark, a uniform glow, a striated glow, or a brush, variously depending upon the form of the electrodes, the pressure of the gas within the tube, and the kind of gas.

At low gas pressures within the tube, and depending on the size of tube, the voltages, kind of gas, etc., the glow may extend throughout the volumetric space of the tube, as illustrated by the neon gas tubes commonly used for signs, etc. In any event, in disruptive conduction the luminosity effective for use is either throughout the tube or at a defined space within the body of the gas. That is to say, so far as the electrodes are concerned, the illumination due to their own brightness is negligible for all practical purposes. This applies to disruptive discharge devices known as "glow lamps" wherein a small area of ionized and luminous gas occurs between the closely adjacent electrodes, while the electrodes themselves may have only such a comparatively low brightness as would be described as a red. Even such a small amount of reddish glow from the electrodes is not a necessary characteristic, but it may be present according to the shape and volume of the electrodes and is due chiefly, if not entirely, to the electrical resistance of the conductive media.

I may mention in this connection, however, that a considerable amount of ionization will occur under some conditions near the surface of the electrodes of a glow lamp, and even around the exposed wires within the tube leading to the electrodes, and this ionization will cause these parts to glow weakly with a color depending upon the kind of gas, this local glow being called "corona."

It has been suggested heretofore to use a blue or purplish glow or corona appearing around the negative electrode in a typical glow lamp as the source of light for photographically recording sound variations, as witness the patent to Case No. 1,647,504 of November 1, 1927. It has also been suggested to use the local disruptive ionization glow or luminosity occurring between two ball electrodes about half a millimeter apart when excited by high frequency alternating current, as witness the patent to De Forest No. 1,482,119 of January 29, 1924.

In this connection I may refer to a paper by A. C. Hardy entitled "The optics of sound recording systems," published in vol. XII, No. 35, Transactions of the Society of Motion Picture Engineers of September 24th to 28th, 1928, at page 768, and elsewhere.

One of the prime objects of the present invention is to provide a light source which may have small area and an exceedingly high degree of brightness of the kind known as incandescence. I may point out that the term "luminosity" applies to all forms of light radiation except those due to the temperature of the light-radiating body, this latter being known as incandescence. The glow lamp is therefore a luminous device while my present lamp is an incandescent light device.

In carrying out my present invention I provide a lamp or tube somewhat in the nature of a glow lamp but having very different characteristics, operating to produce an incandescent light as distinguished from a luminous glow, and producing entirely different and greatly superior results.

My novel light source is also somewhat in the nature of an electric arc in a rarefied gaseous conducting medium. In order to distinguish the invention in this respect from the true arc, whether within or without such medium, I may mention, as one consideration, that in the arc proper the chief source of light is the incandescent crater or surface on the positive electrode or anode, and that the brightness at that electrode does not vary substantially, if at all, with current changes. This brightness is considered actually constant. Because of this constancy in brightness of the true arc it has been suggested to employ this characteristic in the motion picture art for reproducing sound on film, as witness the patent to Engl et al, No. 1,608,261 of November 23, 1926. Since the brightness of the typical arc is invariable it is apparent that such arc, while ideal for reproducing, is wholly without use for recording by the so-called variable-density method, wherein variability of brightness is, of course, essential.

In further reference to the arc I may observe that disruptive discharges at spark gaps, between electrodes, between adjacent short-circuited wires, etc., are ordinarily and very loosely called arcs. There are some similarities between the typical arc and the disruptive discharge, but they are characteristically different in that the drop of potential between the cathode and the gas in the arc is much smaller than in the disruptive discharge device, leaving the principal resistance to current flow at the surface of the arc anode, which becomes incandescent.

In this connection I may mention that my novel lamp may be operated as a typical arc lamp, suitable consideration being given to the size of the electrodes, in which case the anode would become white hot and would be the effective source of the light. The lamp so operated, however, would be short-lived, would be incapable of variation according to current variations, and, for various other reasons would be wholly unsuitable for the uses herein referred to. I hereby disclaim any such use, as I disclaim also the corona glow and other luminosity as herein defined, including the luminous space glow between the electrodes, these three methods or uses being outside of my present invention.

Figure 2:
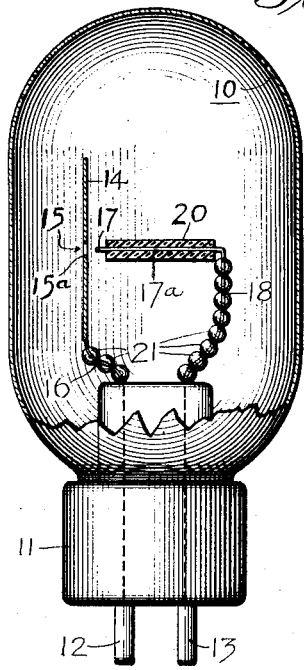
Fig. 2 is a medial vertical section thereof showing the bulb and electrodes of Fig. 1.

Referring to Figs. 1 and 2, the glass bulb 10, the base 11 having projecting pin-like terminals 12 and 13, may be considered essentially in accordance with what is old and well known in thermionic tubes, the bulb as a whole being thus adapted readily to be inserted into and removed from a socket of an appropriate kind whereby current will be conducted to the terminals 12 and 13 and thence to the electrodes.

Within the bulb 10 is a positive electrode or anode 14 shown as a rectangular plate, the shape of which may vary as desired.

Centrally of the plate 14 is a hole or light aperture 15 of sufficient diameter to permit rays from the cathode to pass therethrough. The anode 14 is connected by a wire 16 to a terminal pin 12.

Directly opposite the hole 15 is the negative electrode or cathode 17, which may be in the form of a solid wire and which ordinarily will be only a few thousandths, not exceeding say ten thousandths, of an inch in diameter for electrical light recording on film. The diameter of this wire may vary within considerable limits, however, according to the purpose for which used, and as to this diameter I refer chiefly to the effective end of it in cross view which is the essential and functional light-giving part, the rest of it being merely a conductor to the area at its end. This wire as 17 may be of tungsten, tantalum, molybdenum or the like metals having a high fusing point, or there may be a small section of such wire constituting the free end of the electrode while the rest of it may be ordinary wire.

Figure 8:
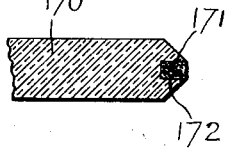
Fig. 8 shows fragmentarily in longitudinal section a preferred type of cathode.

I may, however, employ for the effective end of the cathode an alkali metal oxide or other good electron-emitting substance. In Fig. 8 I have shown a cathode member 170 with the substance 171, to be considered of good electron-emitting properties, packed tightly in a recess 172 in the end of the cathode member. This material 171 is the cathode proper while the part 170 is merely a holder and conductor for it. The cathodes in the other figures may be deemed to be in accordance with Fig. 8 or they may be considered solid metal elements.

The electrode 17 is connected by the supporting wire 18 in communication with terminal 13 of the tube. The end of the cathode 17 will ordinarily be coaxial with the hole 15 and spaced from the plane of the anode 14 a distance which will ordinarily be from say one millimeter to two millimeters when employing the conveniently low voltages ordinarily used in connection with light recording. The diameter of hole 15 will necessarily be small as the edge 15a defining hole 15 determines the closest distance between the anode and the cathode. The cathode 17 could be arranged closer to the edge 15a at one place than at other places. Its free end or effective part may be rearward of plate 14 as illustrated but it may be otherwise positioned relative to the anode.

Surrounding the conductor part 17a of the cathode 17 will preferably be a tubular sleeve 20 of refractory or at least non-ion-emitting material, and surrounding the conductor wires 16 and 18 there would ordinarily be insulating material, which may be in the form of glass beads 21 threaded on the wires respectively. The effect of the insulators 20 and 21 is to prevent any ionization glow in the nature of corona around these wires and which under some circumstances would be objectionable in the critical use intended, and in any event would cause energy loss.

Figure 7:
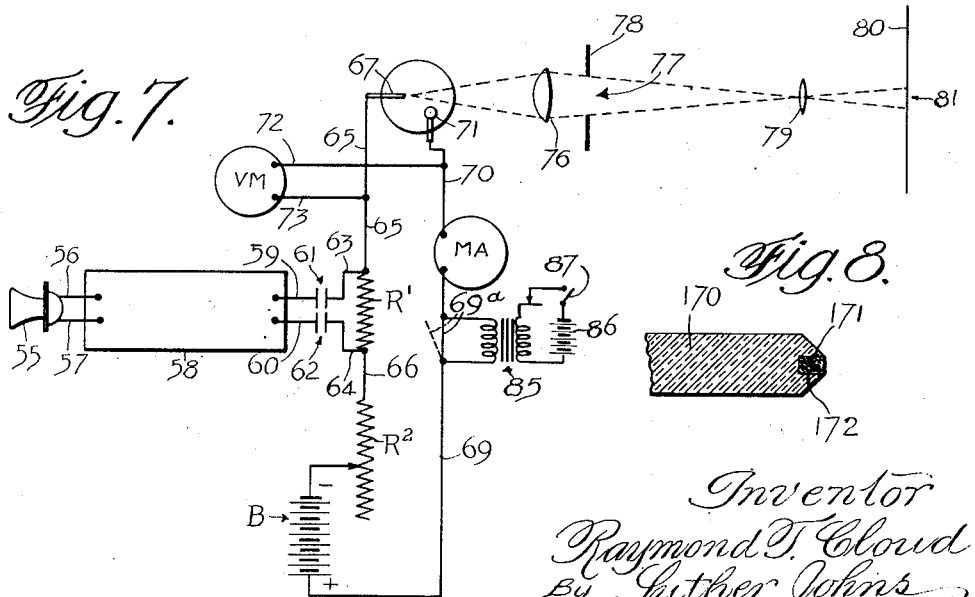
Fig. 7 shows another circuit and in addition thereto an optical system for recording on a movable film.

Light from cathode 17 passes through hole 15 to the optical system, for example as shown in Fig. 7. Anode 14 shields the optical system from all light from the tube except that passing through the light aperture 15, but it has other objects.

Figure 3:
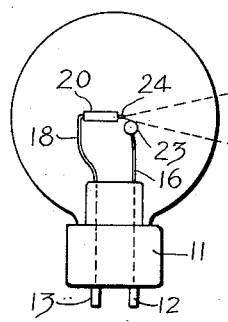
Fig. 3 is a side elevation of a modified form of tube in which the anode is a ball.

Referring to Fig. 3 the only essential difference from the device of Figs. 1 and 2 is in the provision of a ball 23 as the positive electrode or anode of the cell. It is suitably placed slightly below or to one side of the axis of the cathode 24 whereby the light rays may be projected with a horizontal axis, a feature of some importance in the manufacture of a set for use of the tube, an angular arrangement of the tube other than the usual vertical one being thus avoided.

Figure 4:
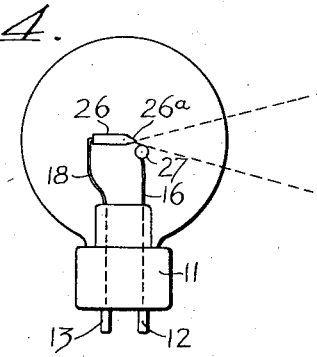
Fig. 4 is a similar view showing the cathode somewhat modified over the form of Fig. 3.

Fig. 4 differs from Fig. 3 in the provision of a cathode 26 which is a cylindrical body of greater diameter than is ordinarily necessary and which is tapered at 26a substantially to a point. Its arrangement with the ball anode 27 is the same as shown in Fig. 4.

Figure 5:
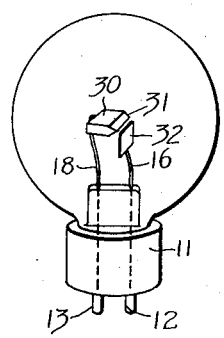
Fig. 5 is another similar view showing modifications in the electrodes.

In Fig. 5 the cathode 30 has an elongated narrow edge 31 and the anode 32 is an elongated plate which may be more than coextensive in length with the cathode edge 31 but which will ordinarily be of about the same length, plate 32 similarly being positioned offset with respect to edge 31 whereby light rays from edge 31 may pass freely over the anode.

Figure 6:
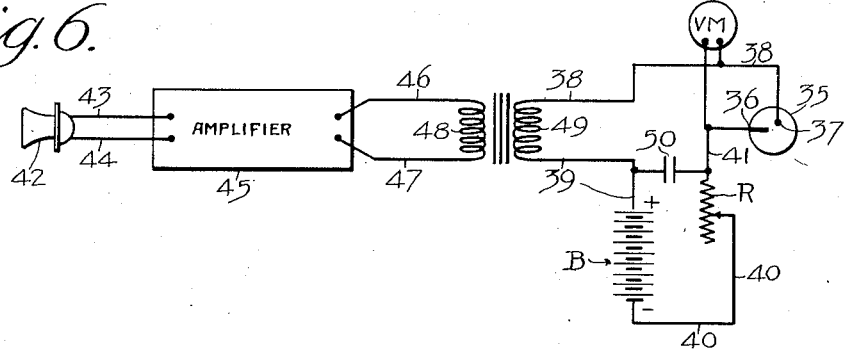
Fig. 6 shows diagrammatically how the tube may be connected in a circuit with modulating means.

Turning to Fig. 6 the bulb 35, the cathode 36 and the anode 37 may be deemed to be in accordance with any of the figures showing lamps complete. Fig. 6 shows the essentials of a circuit for lighting the lamp, the same comprising conductors 38, 49 and 39 leading from anode 37 to battery B, a conductor 40 leading thence to resistance R, and conductor 41 leading thence to the other electrode of the cell.

The resistance R will ordinarily be variable so as to adjust the brightness of the light in accordance with a particular requirement, for example with respect to the emulsion speed of a particular film being used, or with respect to the requirements of the particular optical system that may be employed.

The plus side of the battery is connected with the positive electrode or anode 37. Since the object is to vary the brightness of the lamp in accordance with, for example, sound waves, I have shown in Fig. 6 a microphone 42 connected by wires 43 and 44 to what may be considered a thermionic tube amplifier 45 connected by wires 46 and 47 to the coil 48 of a transformer, the secondary 49 of which is in series with wires 38 and 39 in the electrode circuit. A fixed condenser 50 bridged between the secondary 49 and the electrode 36, as between wires 39 and 41, is a by-pass for the high frequency voice current vibrations whereby their values are not modified by the battery resistance or other action. In other words, the desirable high frequency currents affecting the electrodes of the cell are shunted straight across without going through the battery.

In Fig. 7 the source of voice current or microphone 55 is similarly connected by wires 56 and 57 to the amplifier 58 from whence wires 59 and 60 lead to fixed condensers 61 and 62 respectively, whence wires 63 and 64 lead to conductors 65 and 66 respectively, between which is a resistance R'. Conductor 65 leads to the anode 67 while conductor 66 leads to battery B through another resistance R². From battery conductors 69 and 70 lead to anode 71. The volt meter VM is shunted between the anode and cathode sides by wires 72 and 73 respectively while a milliammeter MA is in series with wires 69 and 70. In this instance the resistance R' bridges conductors 65 and 66 and also conductors 63 and 64.

The blocking condensers 61 and 62 prevent current from the lighting circuit from influencing the amplifier while permitting the high frequencies of the amplified voice currents to pass through to the lighting system. The resistance R' serves not only to regulate the flow of current at the electrodes but also as a load for the amplifier.

The impedance of resistance R' should approximately equal the output impedance of the amplifier and may be fixed or variable as desired. The impedance of R' will ordinarily be less than that necessary for controlling the lamp circuit and I therefore show an auxiliary and variable resistance at R² in order that the lighting circuit may be suitably controlled after the resistance R' has been determined according to the needs of the amplifier.

The device of Fig. 7 is preferred by me over that of Fig. 6, for one reason because a transformer in such a situation is not as reliably constant in its operation as are the fixed condensers, consideration being had of the magnetic saturation which may occur in the core of the transformer due to the effects of the lamp current passing through the secondary thereof.

Fig. 7 also shows a condensing lens 76 adapted to collect rays from the cathode 67 and to pass them through an aperture 77 in the form of a slit in plate 78. The objective lens 79 at the projecting focus of lens 76 throws an image of the slit 78 upon the traveling film 80. For purposes of illustration the image of this slit at 81 on the film is shown quite wide, but in actual practice, as is well understood in the art, this image of the slit would be only about one one-thousandth of an inch in the vertical direction, and is that narrow elongated band which records the variations of the light according to the sound waves received at the microphone, amplified, impressed upon the lighting circuit to vary the intrinsic brightness of the lamp, and projected upon the film.

What causes the light in my new tube is the bombardment of the negative pole or cathode by positive ions originating in the space between the electrodes or partly also at the negative electrode, while the negative ions pass to the negative electrode or anode. These positive ions, traveling at their high speed, develop great kinetic energy and strike the cathode with such force that when the stream of ions is directed upon a surface of suitable extent that surface becomes incandescent.

The anode of this unit is preferably of such considerable area as to cause the ionized space between the electrodes to be substantially in the form of a cone, with its slightly truncated apex at the cathode and its base on the anode. In such a construction the streams of positive ions converge to the apex, and because of such a high concentration of the positive ions the small space bombarded becomes incandescent.

The anode is preferably of relatively great size and mass, further, so as to dissipate readily such heat of resistance as would be developed at the positive pole of a typical arc. The result is such in this respect that in my tube the positive electrode may be, and preferably is, such as not to show any light at all. Such relatively large size of the positive electrode also dissipates readily such heat as may be engendered by the impact of the negative ions thereupon.

The incandescent area of my present lamp is preferably at a free end of the cathode, as illustrated, but the invention is not limited in this respect. The bright area may be exceedingly small, and it will ordinarily be small in such uses as for sound and light recording, for one reason because of advantages gained in the optical system. According to the present invention I have made possible the reduction of the area of the light source greatly below that of any light source hitherto known for such purposes. This light area is defined in some of the illustrations by the circumference of the cathode wire which, as already mentioned, may be only several thousandths of an inch in diameter. In such case the form of cathode shown in Fig. 4 is tapered substantially to what would be a fairly sharp point, being blunted only to this slight extent of several thousandths of an inch. Where a special surface of high electron-emitting characteristics is provided, the light area will be substantially coextensive with such special surface. Ordinarily a light area of several thousandths of an inch will be employed, although in my experiments I have reduced this light area to the amazing extent of less than a thousandth of an inch, with perfect sound-translation results.

My present lamp differs from an arc lamp in various respects. For example, in my new lamp it is not the anode, but the cathode, which becomes incandescent. Furthermore, in the present lamp the heat caused by the resistance of the electrodes and that of the space between them is not a factor of the light production. Then, too, the brightness of the incandescent area in my lamp may be modulated or varied by frequencies in a circuit, as by voice currents.

My present light source differs variously also from the disruptive discharge glow lamp. For example, if I should use a gaseous tube adapted to provide the maximum disruptive glow the luminosity which in any event might occur between the electrodes would be of so relatively low an order of brightness as to be negligible and of no value in the result. This will be more clear when I point out, first, that my optical axis is so directed that some such glow would be blocked off by the anode, and in Fig. 1 most of it. In the next place, practically all of such glow would be outside of the scope of an optical system adapted to function with a substantially point-source as distinguished from a field source of light. Again, my bright spot is many thousand times as bright as is the disruptive discharge luminosity of the space between the electrodes in a gaseous glow lamp. Furthermore, the latitude of exposure of any film will not discriminate between intrinsic brightnesses differing as greatly as those just mentioned. In practice, when the degree of exposure has been adjusted to the light from the bright spot the luminosity of the space glow referred to is far below the minimum requirements to produce a perceptible deposit on the developed film.

I may therefore use a tube containing any of the inert gases ordinarily employed in lamps of different kinds without any effect of the luminous glow upon the results, which are obtained directly from the light spot. I may, however, use a tube having a few millimeters of pressure of some inert gas which yields the minimum luminous glow on ionization, as this ionization glow is of no significance in my device.

Heretofore the amount of light available from glow lamps has been barely sufficient for the proper exposure of the most sensitive negative film available, resulting in poor recordation due to the inferior resolving power and the graininess of the emulsions of such film. With my new light source, however, the intrinsic brightness is more than sufficient for the proper exposure of even positive film, which gives greatly superior results over the use of negative film. In this connection I may mention that the positive film requires approximately twenty-five times the exposure required by the negative film.

The light emitted from the cathode is directly proportional to the current flowing through the tube, and, since the incandescence is only on the surface of the cathode, there is no appreciable heat lag. This freedom from heat lag is deemed by me to be an important feature of the lamp making for great sensitivity. My measurements have demonstrated that the light from the incandescent spot is able to follow accurately frequencies at least as high as 10,000 cycles per second. Such a frequency is far beyond the possibility of recording by hitherto known light-recording methods, whether by light variation or by mechanical vibration.

In this connection I may mention that the extreme smallness and brightness of the light source makes it possible to focus an elongated stream of light directly on the film by using a cylindrical lens or lenses in the optical system, without a slit or slits in a diaphragm, for example as shown in Fig. 7; or a very fine point may be focused directly on the film by means of spherical lenses, for a particular use.

On starting the lamp a disruptive discharge must first be produced. This may be accomplished, for example, by a spark coil as 85 (Fig. 7) energized by a low-voltage battery 86 and connected in the lighting circuit as at the opposite poles of switch 69a in conductor 69. On starting operations switch 87 would be closed and switch 69a opened, producing a series of sparks between the electrodes 67 and 71. Having thus started the lamp, switch 69a is closed and spark coil battery switch 82 is opened. At this time the bright spot appears, accompanied by a sudden drop in potential between the electrodes, this drop being to almost half that of its starting value. At the same time, however, there is no distinguishable change in the current flow. Such a current-voltage characteristic is a phenomenon of the typical arc; but in the present lamp the current-voltage curve marked 85 in Fig. 9 follows a substantially straight line throughout a considerable portion of it, and this characteristic, I believe, is a novel one. It is also a highly important one since that part of the curve is utilized in the normal operations of the lamp.

Figure 9:
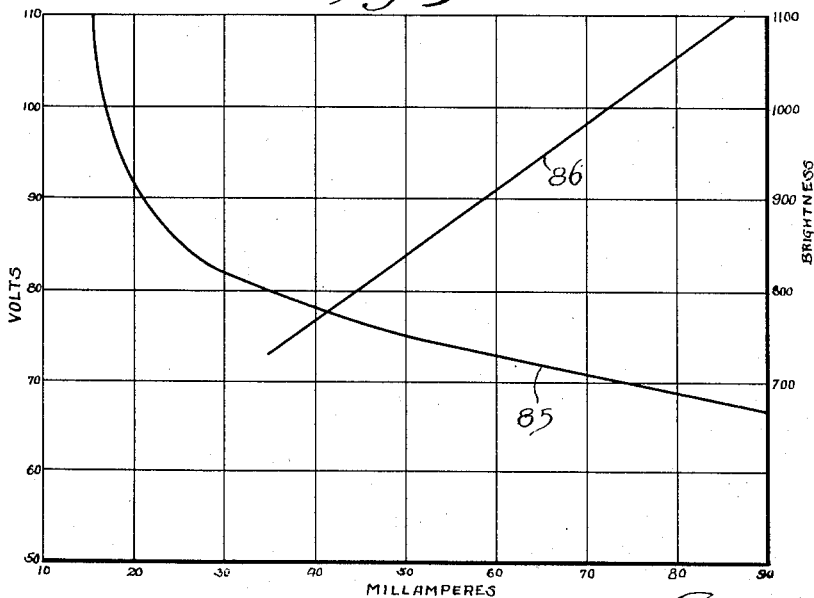
Fig. 9 is a graph showing the relation of light variations to current and voltage variations.

Referring further to Fig. 9 it will be noted that the graph 86 denoting brightness is a straight line, and that the current-voltage line and the brightness line are directly proportional to each other throughout a very considerable range, and throughout a range more than ample for all uses of the device for such purposes as I have indicated.

The numerals at the right hand side of Fig. 9 from 700 to 1100 are to be understood as being arbitrary, although they are roughly an approximation of the candle-square-centimeter, and sufficiently indicate relative stages in brightness with current changes.

The current and voltage values of Fig. 9 are to be understood as representing those between the electrodes, and although there is a slight departure from the tangent of line 85 at the milliampere ordinate 50, this is so slight that a suitable range for recording purposes may be said to extend from even less than forty to beyond ninety milliamperes if desired. However, a mean would be selected at some point, as at say 65 milliamperes, and the excursions of increases and decreases in current on opposite sides of this mean due to the influence of the impressed voice currents would not extend ordinarily beyond say ten milliamperes in either direction, so that the operations in use would be on the straight line part of the current-voltage curve, yielding theoretically perfect results. The variations in the brightness of the light similarly vary in both directions from where the ordinate 65 intersects graph line 86.

It is to be understood, of course, that instead of battery a power unit may be employed. The voltage for the lighting circuit will depend upon the distance between the electrodes, the resistance at R of Fig. 6 or that of R', R² of Fig. 7, and upon other characteristics of the individual lamp or of the circuit in which it is employed, all as will be well understood by those skilled in the art. I have used five hundred volts satisfactorily where the proper external impedance of the amplifier as 58 (Fig. 7) resulted in a drop at R' of 390 volts and the resistances of the rest of the circuit and at the gap between the electrodes resulted in a further drop of 110 volts. The variability at R² enables the adjustment to be made as required.

The lighting circuit is controlled, as by resistance, for the further reason that otherwise the ionic action would build up automatically until the electrodes or one of them became consumed. By means of the resistance feature the light source may be maintained constant.

The lamp bulb 90 of Figs. 10 and 11 may be considered a low-pressure gaseous tube of the same characteristics as those already described. There are two anodes 91 and 92 and a cathode 93, the latter being surrounded by refractory or non-ion-emitting material 94. Supporting wires 95 and 96 lead from cathodes 91 and 92 to terminals 97 and 98 respectively which project through base 99, while a supporting conductor 100 leads from the cathode to terminal pin 101. From Fig. 12 it will be observed that the free end of cathode 93 terminates flush with the end of the refractory material 94. This maintains the small source of light definitely at the end of the wire 93.

In Fig. 10 I have shown diagrammatically how the anodes 91 and 92 may be connected to a common conductor marked 70a and how the cathode may be connected to conductor marked 65a. These conductors 70a and 65a may be considered the same as conductors 70 and 65 in the circuit of Fig. 7. In this diagrammatic way I show how the three-electrode tube of Fig. 10 may be used as a two-electrode tube, for, as shown in Fig. 10 we have what is in effect a single positive electrode or anode, although divided into two parts and with an open space between them through which the light from the cathode issues to the optical system.

The principal reason for showing the device of Fig. 10, however, is shown by Fig. 14, where it is made clear how the present lamp may be used where alternating current is employed for lighting the lamp.

In Fig. 14 we have a source of alternating current 105 in circuit with conductors 106 and 107 containing the primary 108 of a transformer. The secondary 109 is connected at one end to electrode 92 through conductor 110 and at its other end through conductor 111 to anode 91. The secondary 109 has a tap at its electrical middle 112 whence conductor 113 extends to resistance R' and thence through conductor 115 to cathode 93. The microphone 55, the amplifier 58, the condensers 61 and 62 and the conductors 63 and 64, as well as the resistance R', may be considered the same as the similar parts in Fig. 7 and are therefore given the same reference characters and call for no further description.

The frequency of the source 105 will be materially high, say as high as twenty thousand cycles per second, and higher if desired. In any event it will be above the highest frequency in what is effectively the audible range.

An alternating current of high frequency is thus imposed upon the electrodes through transformer secondary 109. Since cathode 93 is connected to the middle of secondary 109 it serves as a common cathode for the two anodes which alternately go plus and minus. The lighting circuit of Fig. 14 is of the rectifying type. Its effect is to cause ionic bombardment of the cathode first from one of the electrodes and then from the other. This bombardment takes place at a frequency of impulses above the audible range, and at so high a rate that the incandescence at the cathode 93 is maintained as uniform as is necessary for the purpose. Any variations from true uniformity are also beyond the audible range so that even if such variations be recorded they are incapable of affecting the human ear.

The amplified voice current is impressed upon the lighting current of Fig. 14 as already described and results in a modulation of the light at audio frequencies.

The invention in the lamp is not limited to recording, since without modulation of the light, as by voice currents, its constancy and brightness are ideal for a lamp for reproducing. In such case the amount of light or intensity required will indicate a larger bright area than the peculiarly small one preferably employed for recording.

The modulated light thus obtained may also be employed in television and arts kindred thereto, and wherever else a light of such character is appropriate. There are many uses also for such a small and bright light, unmodulated, in various arts.

As indicating the peculiar light-giving properties of the bombarded area in my present lamp I may mention that photometric tests show it to have an intrinsic brightness of approximately one thousand candle power per square centimeter at voltage and current values suitable for recording photographically. For further comparison I may mention that the best glow lamps thus far produced and coming to my attention, or as have been discussed in treatises upon the subject, provide less than one candle power of light per square centimeter of light area.

I have shown several of the cathodes as being covered to a large extent by what I have termed refractory or non-ion-emitting material. Such refractory material may be any suitable one of the electrically inert or non-conducting substances such as porcelain, glass, etc. Among the non-ion-emitting substances may be mentioned aluminum. Probably no substance is entirely free from ionic emission, just as there is no perfect insulator, so I am using the term non-ion-emitting in a relative sense and to indicate a substance which does not effectively respond to such ionic bombardment when surrounding a field of good ionic emission.

I contemplate as being included in the present invention all such changes, variations and departures from what is herein specifically illustrated and described as fall within the scope of the appended claims.

I claim:

1. The method of producing high-frequency variations in light which comprises producing a small area of incandescence on one only of cooperating electrodes while limiting the production of materially effective light to that area, and varying the brightness of that area in accordance with high-frequency vibrations.

2. The method of producing high-frequency variations in light which comprises producing a small and limited area of incandescence by ionic bombardment on one only of cooperating electrodes, and varying the brightness of that area in accordance with high-frequency vibrations.

3. The method of producing high-frequency variations in light which comprises producing only on the cathode of an electrical device having cooperating electrodes a small and limited area of incandescence by bombardment of positive ions, and varying the brightness of that area in accordance with high-frequency vibrations.

4. The method of producing high-frequency variations in light which comprises producing an area of incandescence limited to the magnitude of not more than three one hundredths of an inch in diameter on one of cooperating electrodes, and varying the brightness of that area in accordance with high-frequency vibrations.

RAYMOND T. CLOUD.